Patented July 12, 1949

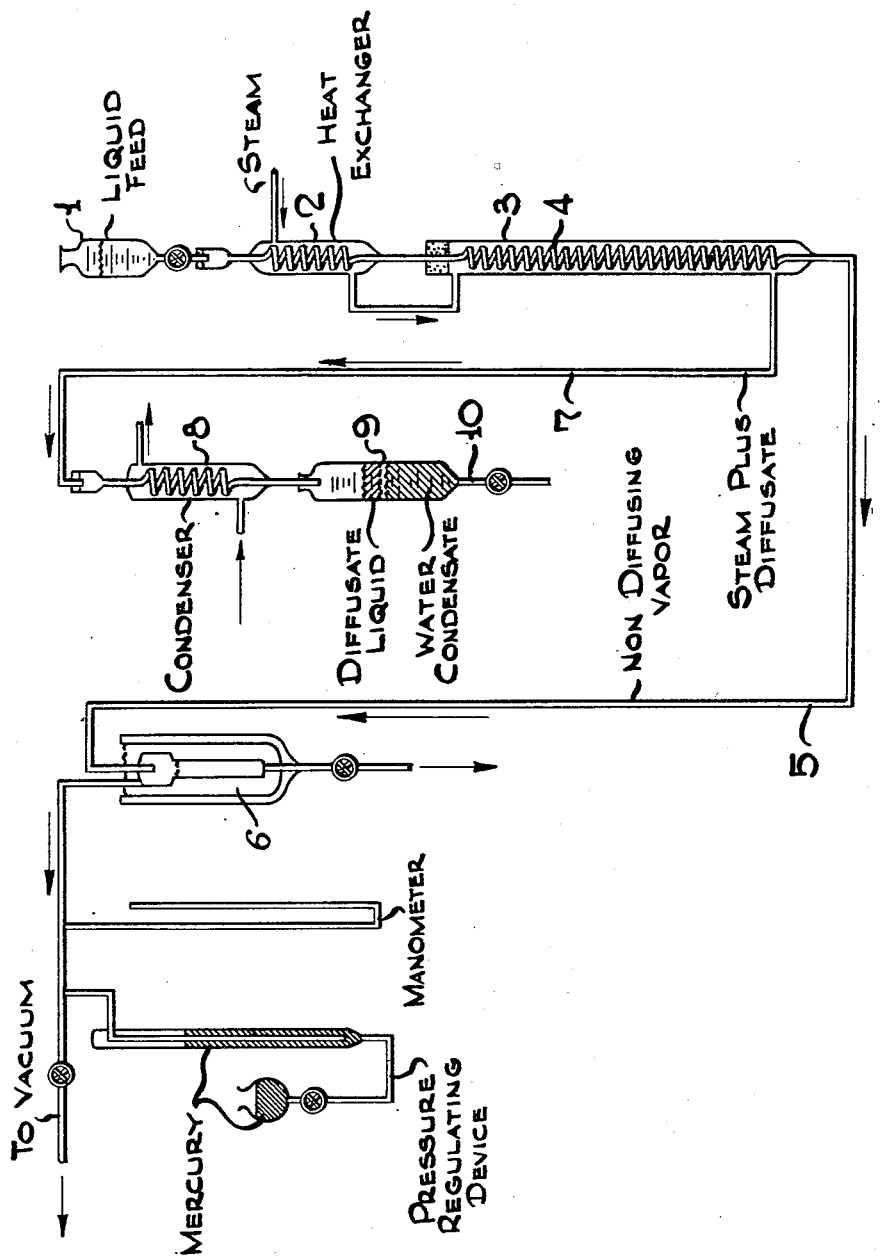

2,475,990

UNITED STATES PATENT OFFICE 2,475,990

SEPARATION OF HYDROCARBONS

Anthony E. Robertson, Roselle, N. J., assignor to Standard Oil Development Company, a corporation of Delaware Application August 4, 1945, Serial No. 608,975

2 Claims. (Cl. 260—676)

This invention relates to the separation of highly branched hydrocarbons from the less highly branched, and particularly, to the separation of the highly branched hydrocarbons from the less highly branched hydrocarbons by diffusion.

It is known that when a mixture of two dissimilar liquids is allowed to contact a membrane the membrane normally hinders the passage of one of these liquids to a greater extent than the other and pressure difference may be established between the two sides. Mineral oils have been freed of paraffins, polymerized products and water by dialyzing the oil in a solvent with a membrane which is made by dipping a support (of cloth) into a bath of rubber.

It is also known that hydrocarbons may be separated by diffusion or dialysis but these separations heretofore have been based on either (a) differences in speed of diffusion as caused by differences in molecular weight, or (b) differences in the solubility of the materials being separated in the diaphragm. Prior art has shown the feasibility of separating hydrocarbons having different solubility characteristics from mixtures, for example, butene-2 from butene-butane mixture, by allowing the hydrocarbons in the gaseous state to diffuse through rubber membranes. Prior art has not shown the feasibility of separating hydrocarbons having similar molecular weights and solubility characteristics.

An object of this invention is to provide a process for separating a hydrocarbon from a mixture of hydrocarbons having similar boiling points.

According to this invention it has been found that straight chain hydrocarbons in the liquid phase will diffuse through a diaphragm of highly impervious rubber, such as Perbunan or Neoprene, five times as fast as will the branched chain hydrocarbons even though both the hydrocarbon compounds boil at the same temperature. This effect cannot be readily obtained with a natural rubber diaphragm, since diffusion through the rubber is too rapid as compared to diffusion of a mixture of these two sets of compounds, so that no selectivity is obtained. It has been found that by maintaining the hydrocarbons in the vapor phase, diffusion of the mixture is accelerated to such an extent that the selectivity is preserved even when the more permeable rubbers are used. This method of diffusion has been used for the separation of normally gaseous hydrocarbons, but works equally well for normally liquid hydrocarbons at elevated temperatures and/or reduced pressures.

The invention will be more clearly understood upon reading the following description with reference to the accompanying drawing:

A mixture of hydrocarbons, for example, a 50-50 mixture of n-heptane and iso-octane, was fed by means of tube 1, through heating unit 2, into separating vessel 3. The liquid feed was passed through a red rubber tubing 4, which is the diffusing diaphragm. A pressure of 560 mm. was maintained inside of the rubber tubing 4, and a temperature of 212° F. was maintained outside by means of steam which was constantly passed over the exit side of the diaphragm. The non-diffusing vapor was withdrawn rapidly by means of pipe 5, cooled in the dry ice-acetone bath 6, and removed to storage. The diffused vapor was removed rapidly by means of pipe 7, passed through cooler 8, separator 9, and likewise, passed to storage by means of pipe 10, after the water condensate had been withdrawn.

During an eight-hour run, 350 cc. of the 50-50 liquid mixture was fed into this apparatus. The volume of diffusate recovered was 76 cc. and it was found to contain 75% n-heptane and 25% iso-octane. The volume of non-diffusing liquid was 260 cc. and it was found to contain 42% n-heptane and 58% iso-octane. The separation can be enhanced to a high degree by a multi-stage operation.

The conditions necessary for the successful operation of this invention are that: (1) The composition of the diffusing mixture must be kept uniform so that the concentration of the more rapidly diffusing component is not depleted in that part of the mixture in contact with the diaphragm, and that: (2) The concentration of the more rapidly diffusing constituent is kept as low as possible on the opposite (exit) side of the diaphragm so that diffusion will not be reversed to any appreciable extent. In other words, the concentration of the more rapidly diffusing constituent must be kept at a maximum on one side of the diaphragm and at a minimum on the other.

The uniformity of the diffusing mixture may be maintained in one of the following ways: (a) The mixture may be kept in the liquid state and subjected to extreme agitation so that the composition of the mixture is kept constant; (b) The membrane may be made fairly impermeable so that diffusion through the membrane is so slow that the composition of the liquid mixture is kept uniform by diffusion throughout the mixture; (c) The mixture is kept in the vapor phase so that diffusion throughout the mixture is facilitated, while diffusion through the membrane is at a slower rate.

The concentration of the more rapidly diffusing mixture may be kept at a minimum on the exit side of the diaphragm in one of the following ways: (a) The diffusate goes into a "receiver" liquid in which the concentration of the diffusate is kept low by distillation or some other suitable means; (b) the diffusing mixture is heated and the diffusing liquid evaporates from the surface of the diaphragm into inert gas or vapor, or into a partial vacuum, in either case the diffusate being recovered by condensation. In case the diffusate evaporates into quiescent inert gas, it is advantageous to have the condenser in immediate proximity to the diaphragm. If the diffusate evaporates into a vacuum, or into a stream of inert gas, the condenser may be located at any convenient point to which the diffusate vapor is conducted.

The following compositions or substances may be used as diaphragms:

1. Hard rubber compositions (such as Ebonite).
2. Polybutadiene.
3. Butadiene-styrene copolymers.
4. Butadiene - acrylonitrile or butadiene-methacrylonitrile copolymers.
5. Polyacrylonitrile or polymethacrylonitrile.
6. Phenol - formaldehyde, urea - formaldehyde, phenol-furfural, and similar heat-resistant resins.
7. Natural rubber.
8. Polymers of 2 chloro-butadiene.
9. Vulcanized natural rubber.

The membranes may be prepared either as regular films, or by deposition on a suitable base, and the selectivity may be modified by using composite membranes of two or more materials in a laminated structure.

I claim:

1. The method of separating iso-octane from normal heptane in a liquid mixture thereof, which comprises passing the liquid mixture into contact with an interior wall of a vulcanized rubber tube acting as a diaphragm maintained at a temperature of about 212° F., and vaporizing diffused normal heptane from an outerside of said tube, and condensing the thus vaporized normal heptane.

2. The method of separating iso-octane from n-heptane in a liquid mixture thereof which comprises contacting the mixture maintained in liquid phase with one side of a diaphragm of a heated vulcanized natural rubber through which n-heptane diffuses at a reduced pressure, the diffused n-heptane being vaporized and rapidly removed from the diaphragm of vulcanized natural rubber and the iso-octane likewise being rapidly removed, and condensing the thus vaporized diffused n-heptane removed from the diaphragm.

ANTHONY E. ROBERTSON.

REFERENCES CITED

The following references are of record in the file of this patent:

UNITED STATES PATENTS

| Number | Name | Date |
| --- | --- | --- |
| 2,159,434 | Frey | May 23, 1939 |